United States Patent [19]

Jones

[11] 4,031,857

[45] June 28, 1977

[54] VOLUMETRIC ACCUMULATING DEVICE

[75] Inventor: Robert D. Jones, Oskaloosa, Iowa

[73] Assignee: Intraco, Inc., Oskaloosa, Iowa

[22] Filed: Mar. 15, 1976

[21] Appl. No.: 666,696

[52] U.S. Cl. .............................................. 119/56 R
[51] Int. Cl.² ........................................ A01K 5/00
[58] Field of Search ................ 119/51.11, 56 R, 53, 119/52 AF

[56] References Cited

UNITED STATES PATENTS

| 3,225,742 | 12/1965 | Hagans | 119/51.11 |
| 3,429,299 | 2/1969 | Wolfe et al. | 119/56 R |
| 3,504,654 | 4/1970 | Geerlings et al. | 119/56 R |

Primary Examiner—Hugh R. Chamblee
Attorney, Agent, or Firm—Henderson, Strom and Sturm

[57] ABSTRACT

A volumetric accumulating device for use in combination with a conveyor system. The device is connected to the underside of the conveyor system and includes a housing having two sidewalls with two end walls positioned therebetween. One of the end walls includes a portion which converges downwardly towards a lower end. A discharge opening is formed adjacent to the lower end of the housing. A metering device for selectively controlling the amount of material received within the housing includes an arcuately shaped plate pivotally attached adjacent to the top of the housing and is positioned transversely with respect to the sidewalls. The edges of the plate are complementary to the shape of the sidewalls which permit them to remain adjacent to the sidewalls during pivotal movement of the plate between a vertically oriented position adjacent to the end wall having the converging downwardly portion, and a horizontally oriented position. The housing further includes an upper portion which includes an inlet opening positioned above the downwardly inclined end wall and between the end wall and the pivotal axis of the plate. A shell is attached to the bottom of the discharge opening with a gate positioned between the discharge opening and the shell thereby permitting selectively opening and closing of the discharge opening.

6 Claims, 9 Drawing Figures

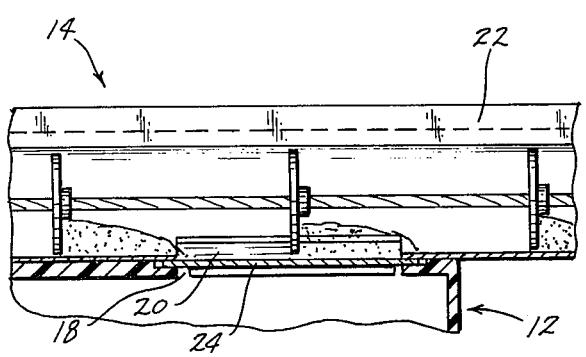
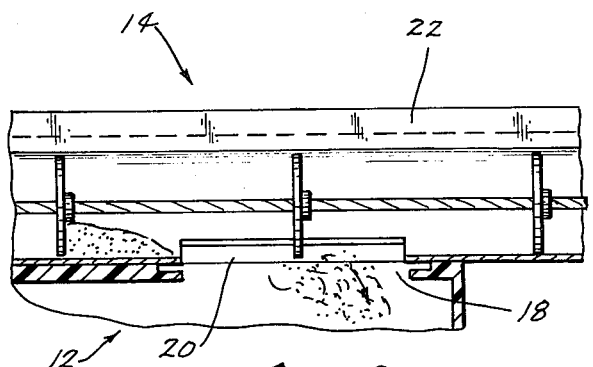
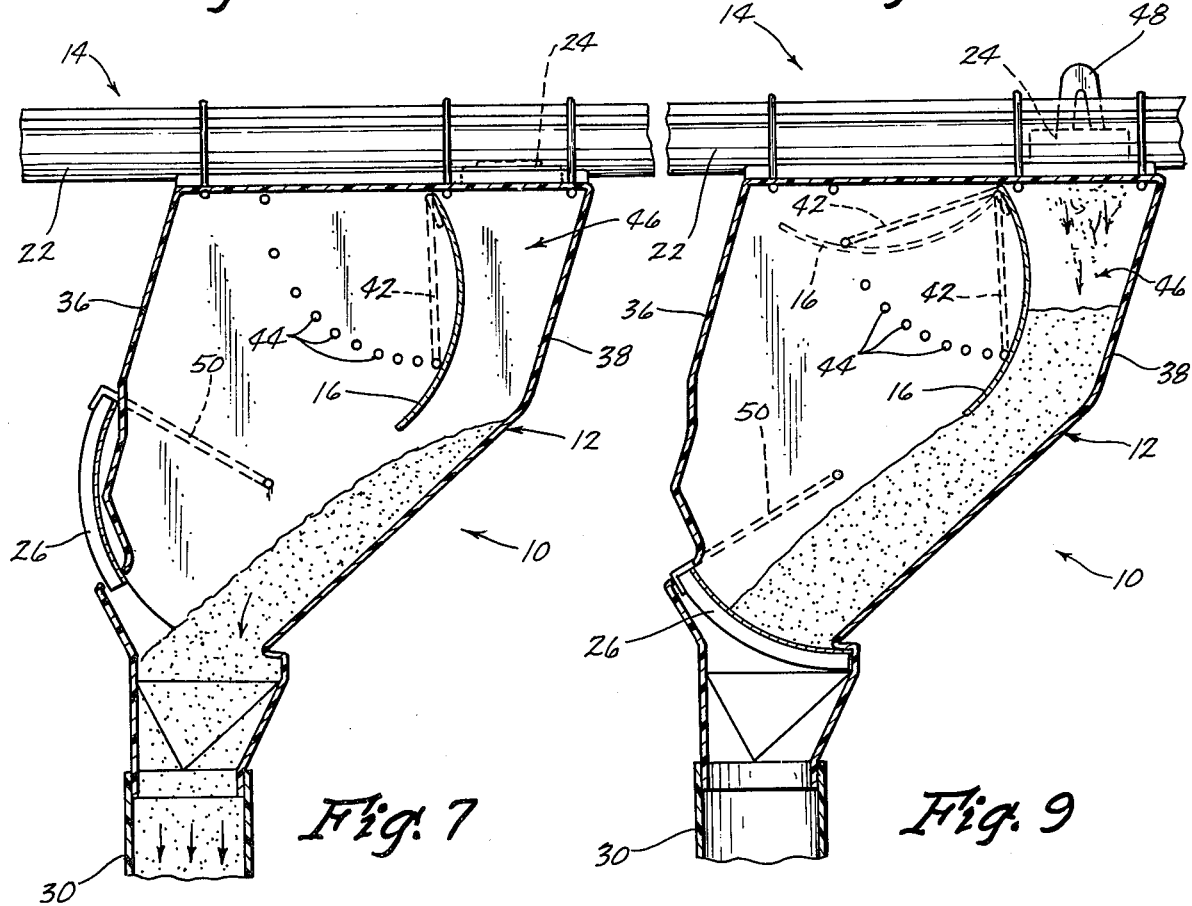

VOLUMETRIC ACCUMULATING DEVICE

BACKGROUND OF THE INVENTION

The present invention relates to a livestock feeding apparatus and more particularly to a volumetric accumulator feeding device for use in conjunction with a feed conveyor system.

The use of a feed conveyor system for distributing feed to livestock have been in use for many years. Typically, the conveyor systems distribute the feed to a number of feeding locations. However, one problem associated with the conveyor method of feed distribution concerns the accurate measurement of the amount of feed delivered to each separate feeding location. It is often desirable to control the amount of feed deposited at each respective feeding location, for example, because of the number of the size of the animals at each location may vary. Therefore, there is a need for a device to accurately measure out a predetermined amount of feed from a feed conveyor system at each individual feeding location.

Another problem associated with feed conveyor systems and feed measurement devices is the tendency of feed or granular substances to become packed too tightly therein. This can prevent the discharge of all or part of the material from the device when it is desired to empty the contents thereof. Therefore, there is a further need for a measuring device which is capable of accurately measuring out a predetermined amount of feed for the feed conveyor system and emptying the entire predetermined amount when desired.

SUMMARY OF THE INVENTION

In accordance with the present invention there is provided a housing having two sidewalls and two end walls positioned therebetween. The housing is connected to a conveyor system and is adapted to receive granular feed material through an upper portion from the conveyor system. The upper portion is adjacent to one of the end walls with the end wall having a portion which converges downwardly to a lower end of the housing, thereby, forming a discharge opening adjacent to the lower end.

A metering device is disposed within the housing for selectively controlling the amount of material receivable from the conveyor system into the housing. The metering device includes an arcuately shaped plate pivotally attached adjacent to one end thereof to the housing and positioned transversely with respect to the sidewalls. The edges of the plate are complementary to the shape of the sidewalls, thereby remaining adjacent to the sidewalls during pivotal movement of the plate with respect thereto. The plate is movable from a vertically oriented position to a horizontally oriented position. A locking device is provided for selectively locking the plate into one of several pivotal positions, thereby setting the volumetric amount of material desired to be accumulated within the device.

The housing further includes an inlet opening located above the downwardly inclined end wall and between the pivotal axis of the plate and the end wall. The device further includes apparatus disposed on the bottom edge of the conveyor system for selectively providing an aperture in the bottom of the conveyor system for permitting the material being transferred by the conveyor system to pass from the conveyor system to the upper portion of the housing.

A gate is positioned about the discharge opening and is movable between a closed and open position wherein the discharge opening is respectively closed and open thereby permitting material to accumulate and flow from the device.

An object of the present invention is to provide an improved feeding device for use on a conveyor feed system.

Another object is to provide a volumetric accumulating device in which the volume of material receivable within the device is accurately and easily controlled.

Another object is to provide a volumetric accumulating device which is adapted to be used with granular and powder material.

A further object of the invention is the provision of a volumetric accumulating device which when filled to capacity will not cause the material to become unduly compacted.

Still another object is to provide a volumetric accumulating device which, when filled to capacity, will permit the material to fall freely therefrom when released.

Still another object is to provide a volumetric accumulating device which upon being filled and opened at the bottom will allow the material within it to be removed by gravity without leaving a significant amount of residue behind.

A still further object is the provision of the volumetric accumulating device which can be easily constructed from lightweight materials.

Other objects, advantages, and novel features of the present invention will become apparent from the following detailed description of the invention when considered in conjunction with the accompanying drawings.

BRIEF DESCRIPTION OF THE DRAWINGS

FIG. 6 is a cross-sectional view taken along line 6—6 of FIG. 5;

FIG. 7 is a cross-sectional view taken along line 7—7 of FIG. 3 showing an initial stage of filling;

FIG. 8 is the same view as illustrated in FIG. 6 but showing the valve member in an open position as illustrated by the dashed lines in FIG. 5; and FIG. 9 is a view like FIG. 7, but showing the position of granular material within the housing when the housing is at a nearly full capacity.

DESCRIPTION OF THE PREFERRED EMBODIMENT

Figure 1:
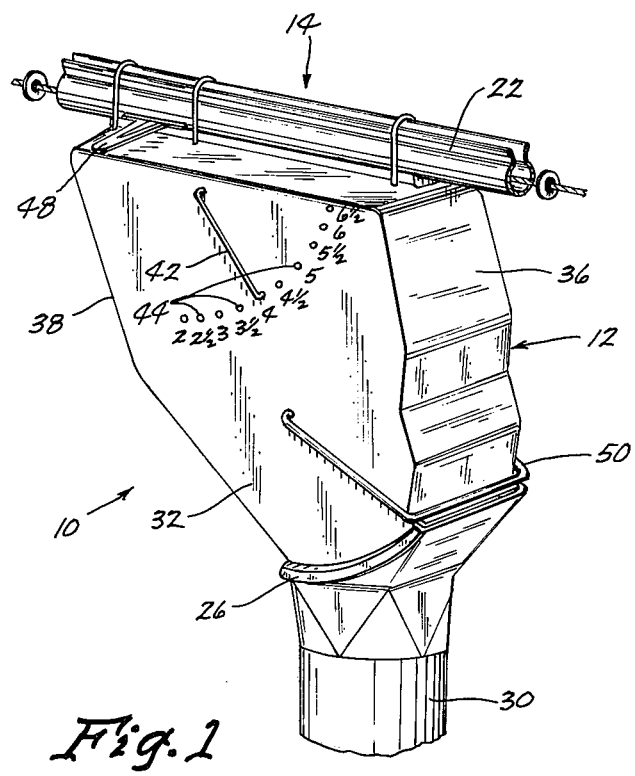
FIG. 1 is a perspective view of a volumetric accumulating device according to the present invention coupled to a feed conveyor system.
Figure 2:
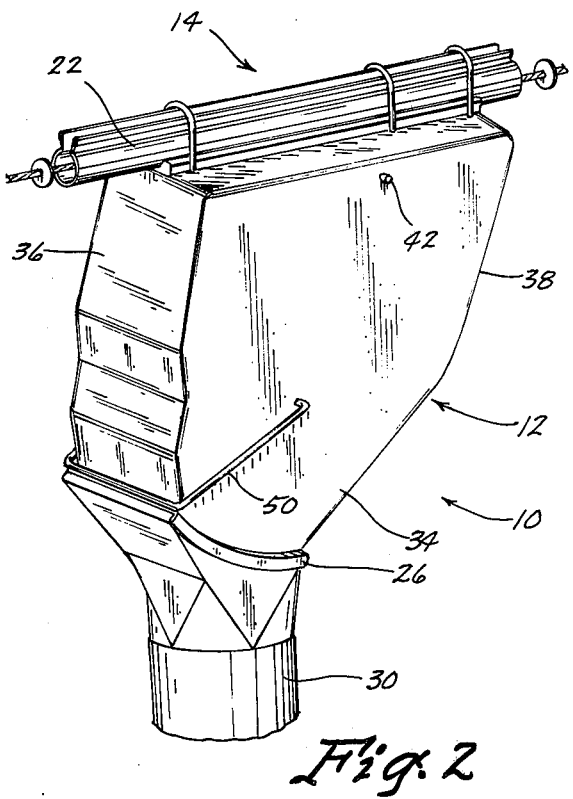
FIG. 2 is a perspective view of the opposite side of the volumetric accumulating device illustrated in FIG. 1.
Figure 3:
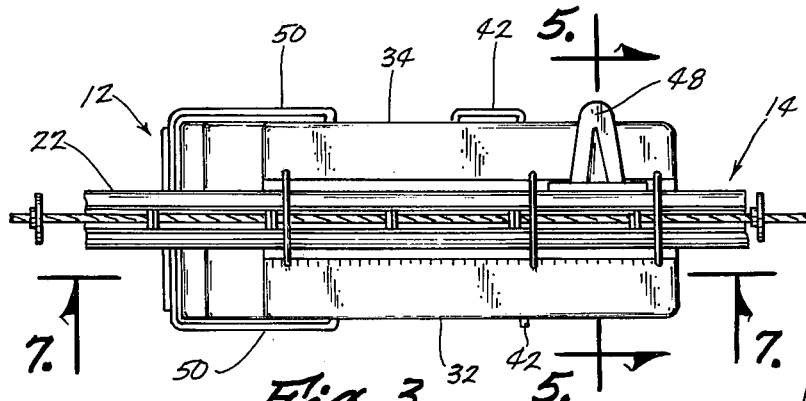
FIG. 3 is a plan view of the volumetric accumulating device.

Referring now to the drawings wherein like reference numerals designate identical or corresponding parts throughout the several views, FIGS. 1 and 2 shows a volumetric accumulating device 10 according to this invention.

Figure 4:
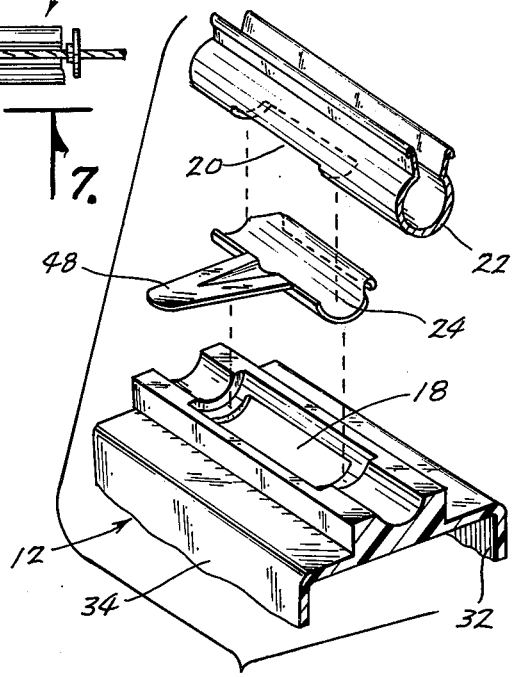
FIG. 4 is a partial exploded view of the feed conveyor system and the top of the volumetric accumulating device.

In general, the volumetric accumulating device 10 includes a housing 12 which is rigidly connected to the under side of the conveyor system 14. The housing 12 includes a metering device 16 (FIGS. 7 and 9) which is pivotally connected to the housing 12. An inlet opening 18 is disposed within the top of the housing 12 (FIGS. 4 and 8) adjacent to a slot 20 (FIGS. 4, 6 and 8) in the tube 22 of the conveyor system 14. Disposed between the opening 18 and the slot 20 of the tube 22 is a valve member 24 which, when rotated, will open up the inside of the housing 12 to the conveyor system 14, thereby permitting the material being transported by the conveyor system 14 to enter the housing 12.

A gate 26 (FIGS. 1 and 2) is pivotally disposed about the discharge opening 28 (FIG. 2) thereby preventing material from leaving the housing 12 when the gate 26 is in a down position. When the gate 26 is raised, the material accumulated within the housing 12 will enter the shell 30, thereby being deposited at the desired location below the device 10.

Specifically, the housing 12 includes two sidewalls 32 and 34, (FIGS. 1 and 2) and two end walls 36 and 38, positioned therebetween. The lower portion of the end wall 38 converges downwardly toward the lower end of the housing 12 and a discharge opening 28 is formed at the lower ends of end walls 36 and 38 and the two side walls 32 and 34.

The metering device 16 (FIGS. 7 and 9) as discussed above is positioned inside the housing 12 and is primarily a plate. The metering plate 16 is pivotally connected at its upper end to the upper portion of the inside walls 32 and 34 by a rod 42. The metering plate 16 is positioned transversely with respect to the side walls 32 and 34, and the edges of the plate 40 are complementary with respect to the side walls 32 and 34. Thus, as the metering plate 16 moves between a vertical and a horizontal position with respect to the end wall 38, the edges of the plate 40 will remain adjacent to the sidewalls 32 and 34.

The rod 42 extends through and beyond both sides walls 32 and 34. As illustrated in FIGS. 1, 2, 7 and 9, the portion of rod 42 extends out of the side wall 32 is formed so as to be movable in a plane parallel to the plane of the side wall 32. Adjustments holes 44 are disposed along the side wall 32 and, as illustrated in FIGS. 1, 7 and 9, the rod 42 is received by any one of the adjustments holes 44. The rod 42 and the metering plate 16 are rigidly fastened together, thus as the rod is moved, the metering plate 16 will rotate about the top thereof. The metering plate 16 is generally arcuately shaped, thus a trough 46 is formed between the metering plate 16, the end wall 38 and the side walls 32 and 34 (FIGS. 7 and 9). The width of the trough 46 is changeable merely by moving the rod 42 to a different one of the adjustment holes 44.

Figure 5:
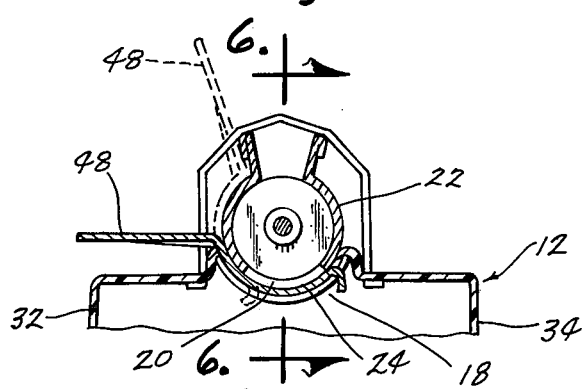
FIG. 5 is a cross-sectional view taken along line 5—5 of FIG. 3.

As discussed above, the upper portion of the housing 12 including inlet opening 18 which is in direct communication with the slot 20 of the tube 22 and of the conveyor system 14 when the valve member 24 is open. The valve member 24 (FIGS. 4 and 5) includes a handle 48. As illustrated in FIG. 5, when the valve member 24 and handle 48 are in a horizontal position, the valve member 24 will completely cover the inlet opening 18, thereby preventing the material being carried through the conveyor system 14 from entering the housing 12. When the handle 48 is rotated as illustrated in FIGS. 5 by the dashed lines, the valve member 24 will no longer completely block the inlet opening 18 thereby preventing the material being transported by the conveyor system 14 to drop into the housing 12. This can also be seen in FIGS. 6 and 8 wherein the material being transported by the conveyor system 14 either passes over the top of the valve member 24 when the valve member 24 is closed (FIG. 8) or the material is free to drop through the inlet opening 18 when the valve member 24 is open (FIG. 8).

As discussed above, the gate 26 provides for the opening and closing of the discharge opening 28. As illustrated in FIGS. 1, 2, 3, 7 and 9, the gate 26 is pivotally connected to the sides 32 and 34 of the housing 12 by a rod 50. The rod 50 is also pivotally connected to both sides 32 and 34 of the housing 12. As the gate 26 is raised, rod 50 pivots about its connection to the housing 12 as illustrated in FIG. 7. When it is desired to again lower the gate 26 to close the discharge opening 28, the rod 50 will serve as the guide for the top of the gate 26 and permit the gate 26 to again rotate downwardly to the closed position by gravity when released.

During the operation of the volumetric accumulating device 10, with the valve member 24 in the open position, the material will flow down to the bottom of the housing 12 and against the gate 26. As the material accumulates, the position of the metering plate 16 will become of primary importance in determining the amount of material to be accumulated by the device 10. As illustrated in FIG. 9, with the metering plate 16 in the position as illustrated by the solid lines, the bottom of the housing 12 will fill up to a level approximately equal to the bottom of the metering plate 16. At this time, the material will continue to enter the housing 12 but will begin to build up through the trough 46 of the housing 12. When the trough 46 is completely filled, the material will no longer enter the housing 12 and will merely pass through the conveyor system 14. However, if more material is desired to be accumulated within the housing 12, the metering device 12 is simply adjusted by moving the rod 42 to one of the higher adjustment holes 44 as illustrated in dashed lines in FIG. 9. When this occurs, more material will be accumulated in the bottom of the housing 12 before the trough 46 begins to fill, as is illustrated by the dashed lines representing the material for the second location of the metering device 16.

During the operation of the device 10, once the housing 12 contains the desired amount of material, the gate 26 may be raised, thereby opening the discharge opening 28 and permitting the material to flow from the housing 12. The gate 26, having an upwardly curved shape, as illustrated in FIGS. 7 and 9, is easily movable to a raised position as shown in FIG. 7, even with the material in the housing 12 pushing down on it. Furthermore, the force of gravity will keep the gate 26 in the downward closed position (FIG. 9) while the housing 12 is filling, thus insuring an accurate measurement of material deposited at this particular location.

Because of the structural configuration of the housing 12, particularly with respect to the bottom portion of the end wall 38 where the wall converges downwardly towards the discharge opening 28 in conjunction with the placement of the trough 46 offset from the discharge opening 28, the material within the housing will not become packed or caked. Thus, the material will easily flow out of the discharge opening 28 when the gate 26 is raised. Furthermore, during storage of the material in the housing 12, there is still little tendency for the material to become packed even when the housing 12 is filled up to the inlet opening 18 and the conveyor system 14 is running.

The volumetric accumulating device 10, while particularly adapted for use with a feed conveyor system 14, would equally be adapted for handling any kind of powder of granular material. Obviously, many modifications and variations of a volumetric accumulating device are possible in light of the above teachings. It is therefore to be understood that, within the scope of the appended claims, the invention may be practiced otherwise than as specifically described herein.

We claim:

1. A volumetric accumulating device adapted to be connected to a conveyor system for receiving and holding a predetermined amount of granular or powdery material from the conveyor system, said device comprising:

a housing having two side walls and two end walls positioned therebetween, said housing adapted to be connected to the underside of the conveyor system, said housing including an upper portion adjacent to one of said end walls, said one end wall being spaced from the other end wall and including a portion converging downwardly toward the lower end of said housing and towards the other end wall thereby forming a discharge opening adjacent to said lower end and adjacent to said other end wall, said upper portion including an inlet opening adapted to receive material therethrough;

means for selectively opening and closing said discharge opening;

metering means for selectively controlling the amount of material receivable within said housing, said means including a plate pivotally attached adjacent one end thereof to said housing and positioned transversely with respect to the sidewalls, the edges of said plate being complementary to the shape of the sidewalls whereby the edges of the plate remain adjacent to the sidewalls during pivotal movement of the plate with respect to the sidewalls, said plate being movable between a vertically oriented position adjacent to said one end wall and a horizontally oriented position; and an inlet opening disposed in said upper portion of the housing and adapted to receive material therethrough, said inlet opening being positioned directly above the downwardly inclined end wall and generally between said one end wall and the pivotal axis of said plate.

2. A volumetric accumulating device as defined in claim 1, wherein said plate is arcuately shaped.

3. A volumetric accumulating device as defined in claim 2, wherein the convex side of said plate is adjacent said one end wall when said plate is in said vertically oriented position.

4. A volumetric accumulating device as defined in claim 1, further including means for selectively locking said plate into one of several pivotal positions thereby setting the volumetric amount of material desired to be accumulated in the device.

5. A volumetric accumulating device as defined in claim 1, further including a substantially closed shell extending downwardly from said discharge opening.

6. A volumetric accumulating device as defined in claim 1 wherein said conveyor system includes means disposed on the bottom edge of said conveyor system for selectively providing an aperature in the bottom of said conveyor system thereby permitting material being transferred by said conveyor system to pass from said conveyor system into the upper portion of said housing.

* * * * *